(12) United States Patent
Giroux

(10) Patent No.: US 6,542,509 B1
(45) Date of Patent: Apr. 1, 2003

(54) VIRTUAL PATH LEVEL FAIRNESS

(75) Inventor: Natalie Giroux, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/200,443

(22) Filed: Nov. 27, 1998

(30) Foreign Application Priority Data

Nov. 28, 1997 (CA) .............................................. 2223118

(51) Int. Cl.[7] .............................. H04L 12/28; H04J 3/16
(52) U.S. Cl. ...................... 370/397; 370/468; 370/391; 370/400
(58) Field of Search .............................. 370/229, 235, 370/236, 236.1, 252, 253, 389, 391, 395.1, 397, 399, 395.21, 395.41, 395.43, 400, 412, 414, 416, 418, 462, 465, 468, 477, 395.5

(56) References Cited

U.S. PATENT DOCUMENTS

| | | | | |
|---|---|---|---|---|
| 4,956,852 A | * | 9/1990 | Hodge | 375/8 |
| 5,105,420 A | * | 4/1992 | Ardon et al. | 370/16 |
| 5,557,611 A | * | 9/1996 | Cappellari et al. | 370/60.1 |
| 5,889,761 A | * | 3/1999 | Yamato | 370/231 |
| 6,069,872 A | * | 5/2000 | Bonomi et al. | 370/236 |
| 6,128,280 A | * | 10/2000 | Jamoussi et al. | 370/230 |
| 6,163,542 A | * | 12/2000 | Carr et al. | 370/399 |
| 6,192,033 B1 | * | 2/2001 | Benson et al. | 370/236 |
| 6,240,172 B1 | * | 5/2001 | Zhu | 379/201 |
| 6,317,416 B1 | * | 11/2001 | Giroux et al. | 370/232 |

OTHER PUBLICATIONS

S. Jamaloddin Golestani, "A Self–Clocked Fair Queuing Scheme for Broadband Applications", 1994 IEEE.

* cited by examiner

Primary Examiner—Hassan Kizou
Assistant Examiner—Hanh Nguyen
(74) Attorney, Agent, or Firm—Marks & Clerk

(57) ABSTRACT

In a connection oriented communications network such as an asynchronous transfer mode (ATM) network, virtual circuit (VC) connections are aggregated onto virtual path (VP) connections to simplify traffic management through core switching elements. This invention provides a system and a method of introducing network level fairness between VP connections in the core. Resource management (RM) cells are used to import relevant traffic weighting parameters from the VC/VP aggregation point to the VP switching element. The weighting parameters are used by a queuing scheme at each switching function to introduce a fairness level component to each VP.

18 Claims, 3 Drawing Sheets

| ACR | MCR | ΣPCRact | ΣPCRadm | ΣSCRact | ΣSCRadm | NUMBER OF CONNEC-TIONS | NUMBER OF ACTIVE VCs | HEADER |
|---|---|---|---|---|---|---|---|---|

VIRTUAL PATH LEVEL FAIRNESS

FIELD OF THE INVENTION

This invention relates, generally, to connection oriented communications networks and, more particularly, to aggregation of connections onto higher level containers whereby network level fairness in distributing available bandwidth to the connections is achieved.

BACKGROUND

Connection oriented communications networks are well known and in general are characterized by the establishment of a circuit connection through the network over which respective end-systems can communicate. Such networks include the public switched telephone network (PSTN) which traditionally has utilized physical circuit switching technology, and packet based networks which utilize virtual circuit switching technology. Examples of packet based network technologies supporting virtual circuits are asynchronous transfer mode (ATM), frame relay (FR), and multi-protocol label switching (MPLS).

In particular, ATM is rapidly becoming the technology of choice for broadband digital communications, as it provides various levels of service guarantees and therefore is well suited to multimedia applications including voice, video and data. The packet used in ATM has a fixed length and is known as a cell. Furthermore, ATM supports two levels of virtual circuit connections: a first or lowest level connection is a virtual channel (VC), and a second or higher level connection is a virtual path (VP) comprising multiple virtual channels that are effectively abstracted by the VP.

The ATM cell has a length of 53 bytes as its basic unit. The first five bytes of every cell are allocated to the ATM layer overhead more commonly referred to as the header. The remaining 48 bytes are used to transport the ATM cells payload. Special cells, referred to as Resource Management (RM) cells, can be used to perform different control functions for a connection. The specific purpose of an RM cell is identified using a protocol identification field.

The ATM Forum's Traffic Management Specification version 4.0 has established five categories of service relating to ATM traffic. The five categories of service are: constant bit rate (CBR); real time variable bit rate (rtVBR); non-real time variable bit rate (nrtVBR); unspecified bit rate (UBR); and available bit rate (ABR). Each service provides a different level of Quality of Service (QoS) using different traffic descriptors.

The ABR service category incorporates an integrated flow control loop using resource management (RM) cells with a specific protocol ID field. This RM cell collects congestion information at each network element and is returned to the source where the information is used in controlling the source send rate. The use of RM cells for the control of CBR, VBR and UBR service connections is at present undefined in the ATM Forum Traffic Management Specification version 4.0. However, RM cells are permitted on these connections.

With respect to the two levels of connections in ATM, a VC refers to a logical connection between two end points for the transfer of ATM cells, while a VP represents a logical aggregation of VCs that typically have the same termination point. Through the utilization of a VP, numerous (up to 64,000, for example) VCs can be combined into a single VP. Cells are identified using a combination a virtual connection identifier (VCI) and a virtual path identifier (VPI). Cells that are aggregated onto a VP all share the same VP value. When cells are switched by a VP switch, the switch only considers the VPI and does not generally keep any VC level information. VCs that are aggregated onto a VP can have a different service category than the one of the VP as long as the VP provides a better quality of service than the underlying VCs. Virtual path connections are beneficial at the core of a network where the VP is used extensively to reduce the number of connections and to simplify network management, thus increasing scalability.

Over the past number of years considerable effort has been devoted to designing complex traffic management schemes which attempt to achieve a fair sharing of network bandwidth between VCs. Network level fairness wherein each VC gets a weighted fair share of the available bandwidth, is an important aspect of traffic management. In this context "weighting" is a proportion or ratio of the available link bandwidth that is allocated to a particular VC or VP at a given instant.

The aforementioned ATM Forum Traffic Management Specification version 4.0 (TM4.0) establishes criteria respecting various service related aspects of ATM traffic including service categories and quality of service guarantees. Scheduling mechanisms are not specified in TM4.0 however, these mechanisms are key in providing fair access to bandwidth. One example of a scheduling mechanism that provides fair access to available resources is described in "A self-Clocking Fair Queuing Scheme for Broadband Applications" by S. J. Golestani, INFOCOM 1994, June 1994. With such a scheme, the system can instantaneously allocate available bandwidth between different queues proportional to a weight associated with each queue.

There remains, however, a fairness and efficiency issue arising when using VPs and switching VPs. VPs are set up with a specific set of traffic descriptors prior to having VCs dynamically added and removed onto it. In the VP switches there is no knowledge of how much traffic is aggregated at a given instant on a given VP aggregation point. Accordingly, the bandwidth is allocated proportionally to the VP traffic descriptor without any consideration of the amount of traffic flowing on each VP at a given time. For example, assuming that two VPs are set up with the same traffic descriptors, but at a given instant, one VP aggregates a load that is double the load of the other VP, both VPs will be allocated the same amount of bandwidth in the VP switch, and the VCs aggregated on the VP with the largest load will received a lower share of the available bandwidth than would be if there were no VPs used.

Therefore, a scheme that improves the network level fairness when using VPs such as in an ATM core is desirable.

SUMMARY OF THE INVENTION

It is an object of the present invention to provide a new and improved methodology for distributing available bandwidth to connections in a communications network.

Therefore, in accordance with a first aspect of the present invention, there is provided a system for improving network fairness amongst virtual path connections in a connection oriented network. The system comprises: aggregation means for aggregating virtual circuit connections onto virtual path connections; means associated with the aggregation means for selectively sending a VP resource management cell with load information respecting the virtual path; virtual path switching means for routing the virtual path connections to a designated destination; and means in the VP switching means to intercept the resource management cell and to use the load information therein to allocate a fair share bandwidth to the virtual path.

In accordance with a second aspect of the present invention, there is provided a method of improving network fairness in a communication network utilizing virtual circuit connections aggregated onto virtual path connections for carrying traffic across the network. The method comprises: providing aggregation means to aggregate VC connections onto VP connections; providing means associated with the aggregation means to include VP resource management cells on the virtual path connection, the resource management cells including load information; providing switching means to route the VP traffic through the network; and providing means in the VP switching means to intercept the load information and to allocate bandwidth to the VP in accordance with the weight information.

BRIEF DESCRIPTION OF THE DRAWINGS

The invention will be better understood from the following description of exemplary embodiments together with reference to the accompanying drawings, in which.

DETAILED DESCRIPTION OF THE INVENTION

Figures 1, 2:
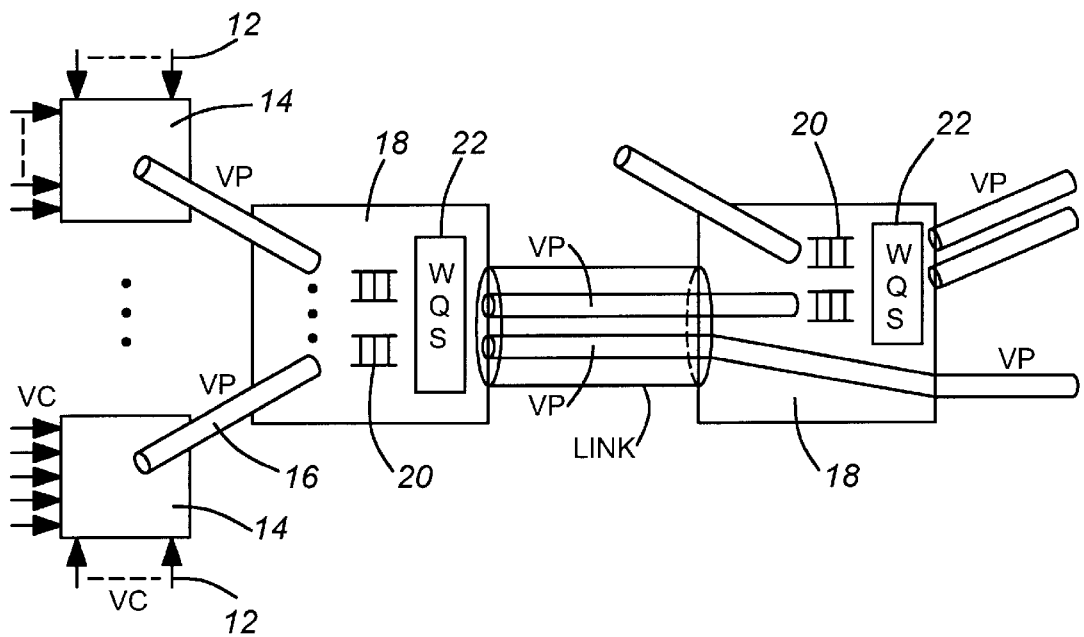
FIG. 1 is a high-level block diagram of a VC/VP aggregation and VP switching network.
FIG. 2 illustrates the content of a resource management cell having fields that can be used for weight information.

FIG. 1 is a high-level diagram of a virtual circuit (VC) and virtual path (VP) switching network. As shown, varying numbers of VCs 12 are aggregated onto VPs at different aggregation points 14 throughout the network. The resulting virtual paths (VP) 16 are connected to and are routed through the network by VP switching functions 18. Within a VP switch 18 a VP may traverse one or more contention points. At each contention point, the data is queued 20 awaiting service. A scheduling mechanism (not shown) at each contention point schedules the order at which traffic is transmitted from each queue. The cell is then transmitted from the contention point.

As discussed previously, in prior art VP switching functions, there is no knowledge of the amount of traffic that has been aggregated at a given instant on a given VP. Due to this deficiency, bandwidth is allocated proportionally to the VP traffic descriptor. Typically, no consideration is made to the amount of traffic that is flowing on each.VP and as a consequence the prior art network level switching can demonstrate unfairness at the VC level when the VPs are not evenly loaded. The present invention seeks to improve the network level fairness when switching VPs. In order to improve fairness at the network switching level the present invention uses the aforementioned resource management (RM) cells to present weighting information to VP switches.

Since VPs can use different categories of service, in accordance with this invention, a distinction is made between utilization of the RM cells for ABR VPs and for non-ABR VPs.

With respect to the ABR service category, RM cells are sent periodically from the VP aggregation point in order to create a flow control loop as per the ABR service defined in the ATM Forum's Traffic Management Specification. Furthermore, the ABR aggregation point would also indicate, in unused fields of the ABR RM cells, information regarding the current load at the aggregation point.

For the non-ABR service categories, the VP aggregation point periodically inserts an RM cell into the stream of data cells carried over a particular VP. The RM cell includes a specific protocol identifier (ID) with an indication of the current load on the aggregation point.

The load at the aggregation point can be indicated using information such as the sum of admitted and/or active peak cell rate ($\Sigma$PCR), the sum of admitted and/or active sustainable cell rate ($\Sigma$SCR), the number of admitted connections and the number of active connections at the time of sending the message. This information allows for flexibility in determining the weight for the VP based on flexible fairness criteria.

An example representation of a management message, namely the resource management cell having fields which contain the load information of a VP aggregation point is shown in FIG. 2. Further details on the RM cells and the various fields therein are provided below.

The VP switching function 18 receives the RM cell and extracts the necessary data. The data is then used to update the bandwidth weightings of the weighted queuing service (WQS) process 22 implemented at contention points in the VP switching function 18. The WQS process 22 effects an algorithm that efficiently schedules cell transmission based on the "weight" assigned to the queues. It assumes that the queues share fairly the bandwidth that that is available at a given instant. Briefly, "weighting" may be defined as allocating bandwidth fairly amongst queues at a given contention point proportional to some weighting information. Weighted fair queuing (WFQ), as discussed by Golestani, represents one WFS implementation, and a weighted round robin scheme is another example. In accordance with this invention "weighting" is the proportion of link bandwidth or available that is allocated to a particular VP.

Figure 3A:
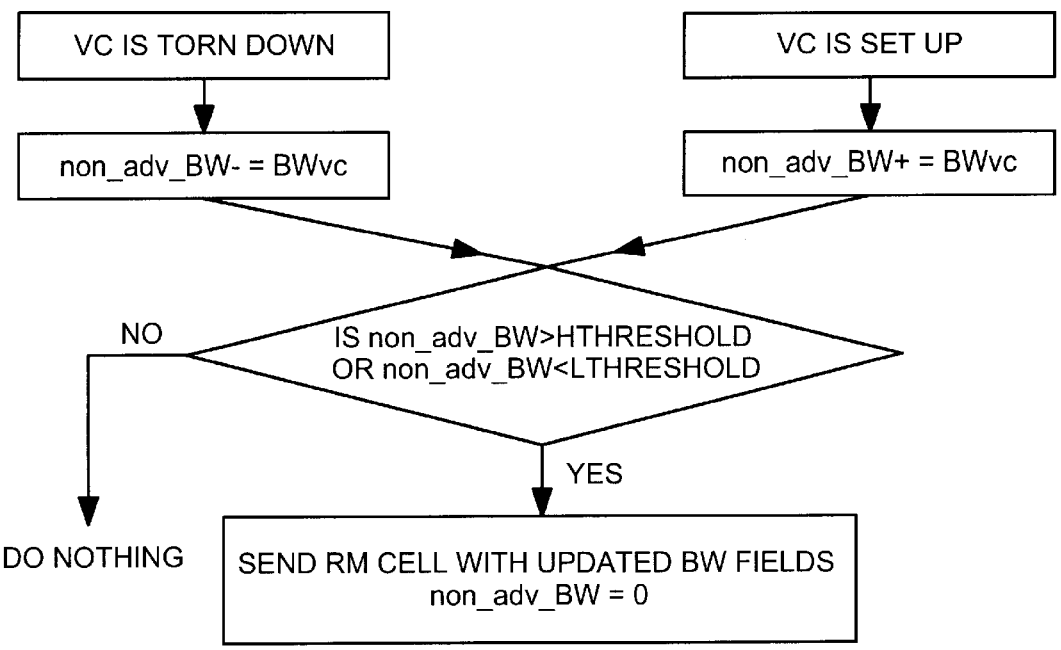
FIG. 3A is a flow diagram showing how the weight information is calculated at the VP aggregation point for non-ABR VPs without activity monitoring.

When using non-ABR service category, according to the invention, resource management cells are implemented for periodically informing the network of the load at the aggregation point. In the present invention, as a VC is being configured or becomes active, the VP aggregation point determines if the value of the change in load is greater than a predetermined positive threshold value or lower than a predetermined negative threshold value. If the change is greater or lower than the aforementioned thresholds, the aggregation point inserts an RM cell with the updated loading state to the VP switching function. The switching function uses this loading data to update the bandwidth weightings of the WQS process 22. However, if the change in load is within the predetermined threshold levels no RM cell is sent to the VP switching function and as a consequence the bandwidth weightings do not change. FIG. 3A is a flow diagram relating to the steps followed at the aggregation point 14 if the data traffic is one of the non-ABR service categories. In this diagram no consideration is given to the activity status of the virtual connection. This scheme involves the decision process as to whether a RM cell with updated weighting information is generated at the aggregation point and sent to the VP switches in the network. Two paths are indicated: one in which a VC is being torn down and a second in which a VC is being set up. At point A in each path of the diagram the non-advertised bandwidth (non_adv_BW), which is a measure of the change in load at the aggregation point, is examined. At this point the VC has either been set up or torn down but the network is not yet aware of the new or removed connection. At step B the non_adv_BW is compared with system configurable high and low thresholds (for example, 10 Mbps and −10 Mbps respectively). If the change in load value is between the high and low threshold levels no RM cell is sent. If the change in load falls outside of either the high or low threshold values a RM cell is generated and sent to the VP switching point with updated load information in the appropriate fields. This information can include any of SCR; PCR; ACR or MCR combined for all the VCs at the aggregation point.

Figure 3C:
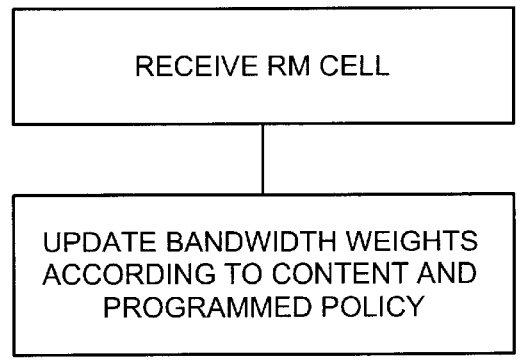
FIG. 3C is a flow chart showing how the RM cell content is handled at the VP switching point.
Figure 3D:
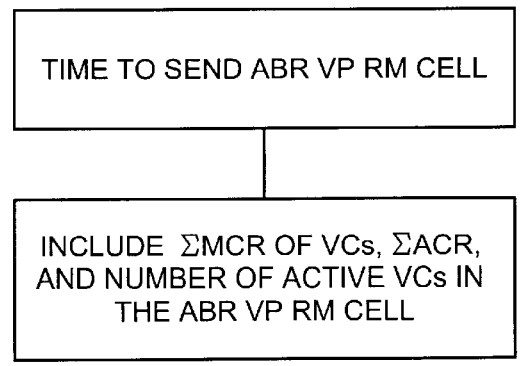
FIG. 3D is a flow diagram showing how the weight information is calculated at the VP aggregation point for ABR connections.
Figure 3B:
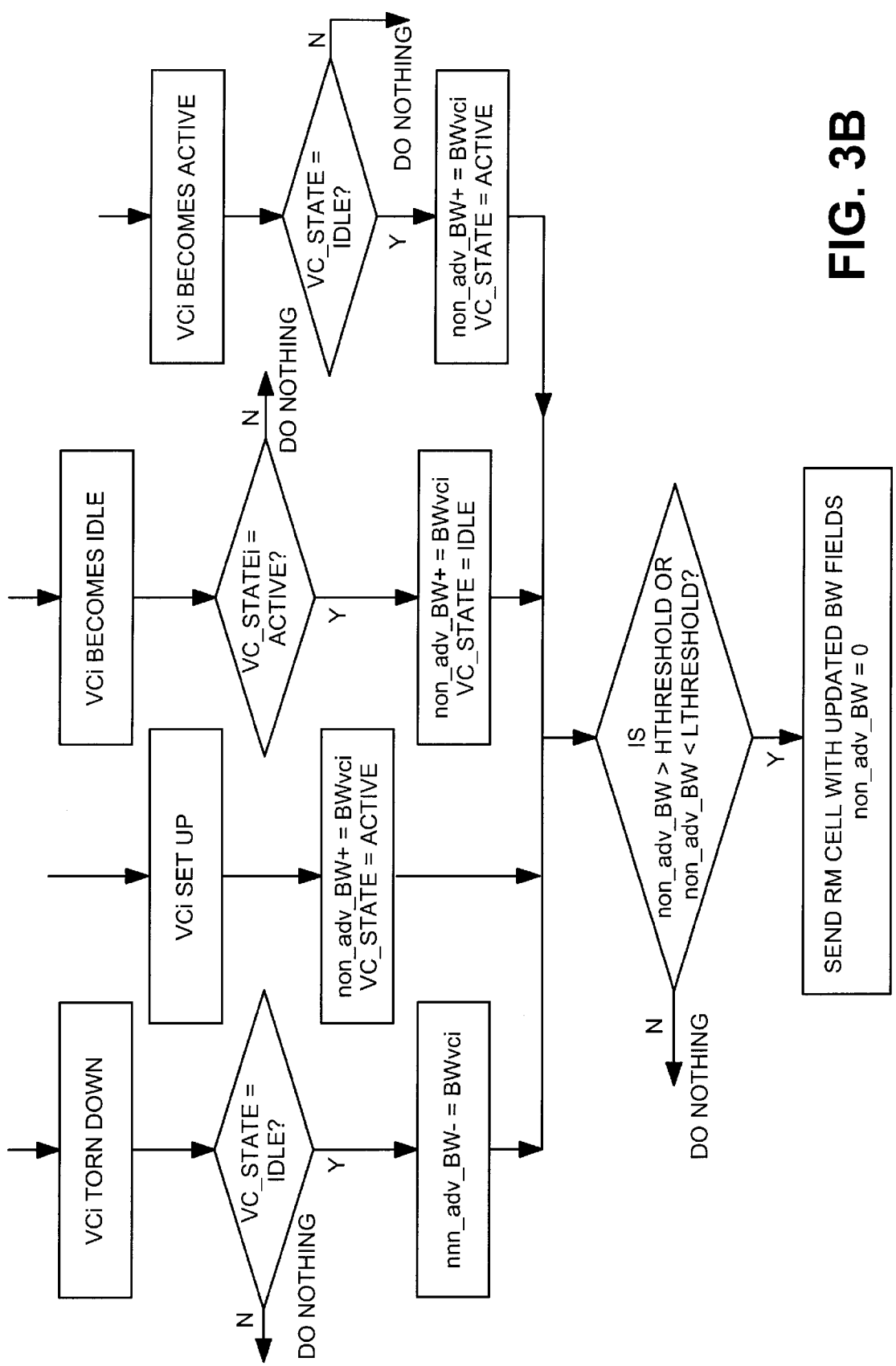
FIG. 3B is a flow diagram showing how the weight information is calculated at the VP aggregation point for non-ABR VPs including activity monitoring.

FIG. 3B is a flow diagram representing a more sophisticated method for providing improved performance for a non-ABR connection at the VP switching function 18. In this embodiment the activity status i.e. whether the VC connection is active or idle, is also considered. As in the previous example a RM cell including load information is sent by the aggregation point to the VP switching point if the new change in load bandwidth value falls outside of either the low or high threshold levels.

FIG. 3C represents, in a simplified flow diagram format, the processing steps at the VP level switching point upon receipt of a RM cell with weighting information attached.

FIG. 3D illustrates at a high level a processing scheme for ABR type traffic at a VP aggregation point.

Weighted queues scheduling is implemented at the VP switching function to allocate the available bandwidth fairly amongst queues, each queue buffering traffic from a VP contending for resources at a contention point. Each queue is assigned a weight. Under the present invention, the weight is determined using the load information provided in the RM cells by the aggregation point and a given fairness policy used at the switch. The weighting could be based on the $\Sigma PCR$ (admitted and active), the $\Sigma SCR$ (admitted and active)., the $\Sigma ACR$, the $\Sigma MCR$, the number of connections or even the number of active VCs. The weighting can be based on a combination of one or more of the previous parameters. These calculations are then used to determine the duration of time allocated by the queue server to each input queue. With heavier weighting, certain queues will obtain greater proportion of the available bandwidth. As a desired result, inputs with the greatest amount of aggregated traffic will receive greater proportion of the available bandwidth.

The bandwidth allocation policy can be normalized in terms of the following relevant information:

$fct$ (function)($\Sigma MCR/VP$)
  $VC$
$fct$ ($\Sigma ACR/VP$)
  $VC$
$fct$ ($\Sigma SCR/VP$) → $W_{VPi} = \dfrac{W \; \Sigma SCR}{\dfrac{VConVPi}{\Sigma SCR}}$
  $VC$ $\qquad\qquad\qquad\qquad VC$
$fct$ ($\Sigma PCR/VP$)
$fct$ (# active conn./$VP$)
$fct$ (# connections/$VP$)

where $W$ = weighting factor
$MCR$ = minimum cell rate
$ACR$ = allowed cell rate
$CSR$ = sustainable cell rate
$PCR$ = peak cell rate
$VP$ = virtual path
$VC$ = virtual circuit
or can be user configurable as a combination of the above.

Although a specific embodiment of the invention has been illustrated and described it will be apparent to one skilled in the art that various alternatives can be implemented. It is to be understood, however, that such variations, including, but not limited to, new service categories, using weighting information for congestion control, are considered to fall within the scope of the invention as defined by the appended claims.

I claim:
1. A system for improving network fairness amongst virtual path (VP) connections in an network comprising:
   aggregation means for aggregating virtual circuit (VC) connections onto VP connections;
   means associated with said aggregation means for selectively sending a management message with load information respecting said VP;
   virtual path switching means for routing said virtual path connections to a designated destination; and
   means in said switching means to intercept said management message and to use said load information therein to allocate a fair share bandwidth to said VP.
2. A system as defined in claim 1 wherein said network is an asynchronous transfer mode (ATM) network.
3. A system as defined in claim 2 wherein said management message is a resource management (RM) cell.
4. A system as defined in claim 3 wherein said virtual path connections carry Available Bit Rate (ABR) category of service and wherein said load information from said aggregation means is included in reserved fields of an ABR RM cell.
5. A system as defined in claim 3 wherein said resource management cell with load information is inserted in data flow at said aggregation means when a change in load at said aggregation means is greater than a pre-determined threshold.
6. A system as defined claim 3, wherein said resource management cell with load information is inserted in data flow at said aggregation means when a change in load at said aggregation means is less than a pre-determined threshold.
7. A system as defined in claim 3, wherein said resource management cell with load information is inserted in data flow at said aggregation means when a change in load at said aggregation means is greater or less than pre-determined thresholds.

8. A system as defined in claim 3 wherein said resource management cell with load information is inserted in data flow at said aggregation means approximately at regular time intervals.

9. A system as defined in claim 1 wherein said network is a frame relay (FR) network.

10. A system as defined in claim 1 wherein said network is a multi-protocol label switching (MPLS) network.

11. A system as defined in claim 1, wherein said load information includes information relating to Peak Cell Rate (PCR); Sustainable Cell Rate (SCR); Allowable Cell Rate (ACR); Minimum Cell Rate (MCR); number of connections; or number of active VCs.

12. A system as defined in claim 1, wherein said information is used by said VP switching point to determine weight used for allocating bandwidth dynamically available to said virtual paths.

13. A method of improving fairness in a virtual circuit network utilizing circuit (VC) connections aggregated onto virtual path (VP) connections for carrying traffic across said network, the method comprising:

providing aggregation means to aggregate VC connections onto VP connections;

providing means associated with said aggregation means to integrate management messages onto said virtual path connections said management messages including load information;

providing VP level switching means to receive said VP connections and to route said VP connections through the network in accordance with traffic descriptor information assigned thereto; and providing means in said switching means to intercept said load information and to allocate bandwidth to respective VPs in accordance with said load information.

14. A method as defined in claim 13 wherein said network is an asynchronous transfer mode (ATM) network.

15. A method as defined in claim 14 wherein said management message is a resource management (RM) cell.

16. A method as defined in claim 15, including the step of inserting said resource management (RM) cell within data flow of said VP when a change in load at a non-ABR virtual path aggregation point is higher than a high level threshold or lower than a low threshold level.

17. A method as defined in claim 15, wherein said category of service is Available Bit Rate (ABR) and said load information is included along with said RM cells used for flow control loop.

18. A method as defined in claim 13, wherein said load information relates to Allowed Cell Rate (ACR); Minimum Cell Rate (MCR); Peak Cell Rate (PCR); Sustainable Cell Rate (SCR); number of connections; or number of active VCs of the total VCs aggregated onto said VP.

* * * * *